Feb. 17, 1931.   L. C. SMITH   1,793,022
SKATE WHEEL
Filed Feb. 25, 1930

INVENTOR
Lora C. Smith
BY
ATTORNEYS

Patented Feb. 17, 1931

1,793,022

UNITED STATES PATENT OFFICE

LORA C. SMITH, OF KOKOMO, INDIANA, ASSIGNOR TO KOKOMO STAMPED METAL COMPANY, OF KOKOMO, INDIANA, A CORPORATION OF INDIANA

SKATE WHEEL

Application filed February 25, 1930. Serial No. 431,271.

This invention relates to wheels or rolls and more particularly to the construction of wheels especially adapted for use upon roller skates.

An object of the invention is to provide a construction adapted to facilitate manufacture and reduce the cost, and which construction is such as to provide an external ground contact surface of long wearing qualities. A further object is to simplify construction in that a ball bearing serves the double purpose of an anti-friction bearing and means for anchoring said wheel upon its support against longitudinal movement thereon, and wherein the cup of said bearing forms a part of the wheel body and said body is formed of metal stampings, the parts being constructed and arranged to facilitate assembly and lessen the cost of production.

With the above and other ends in view, the invention resides in the matters hereinafter set forth and more particularly pointed out in the appended claims, reference being had to the accompanying drawing, in which—

Figure 1:
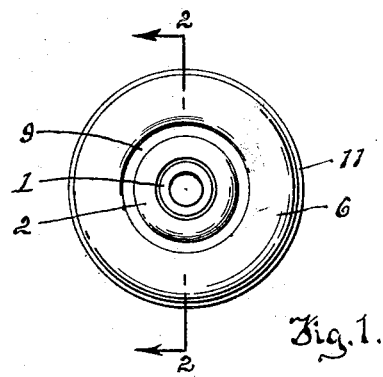
Figure 2:
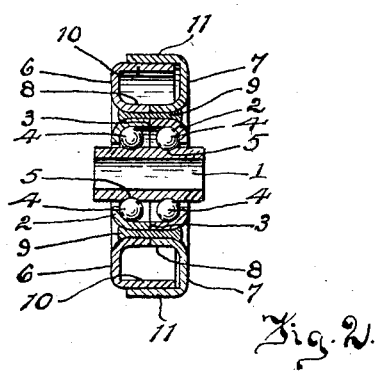

Figure 1 is a side elevation of a wheel illustrative of an embodiment of the present invention; and Fig. 2 is a transverse section substantially upon the line 2—2 of Figure 1.

The hub of the wheel consists of a short length of tube 1 through which the axle shaft (not shown) extends with said tube secured in any suitable manner to said shaft and rigidly held against rotation. The wheel proper comprises a pair of cup members 2 sleeved upon the tube 1 with the open sides of these cups open toward each other and toward the sleeve with their adjacent edges 3 in abutting relation, thus forming a double cup for holding two rows of balls 4 which balls seat within ball races 5 formed in the exterior of said sleeve. The diameter of said balls is such relative to the external diameter of said tube 1 and the internal diameter of said cups, that said balls are held in said races 5 by the cups against escaping therefrom and said balls therefore form the sole means for attaching the wheel to said sleeve or tube 1 against longitudinal movement thereon.

The outer part or body of the wheel is formed of two annular channel sheet metal stampings 6 and 7, the open sides of these channel members being in confronting relation with the inner flanges 8 of the two body members in edge abutting relation and of a greater external diameter than the external diameter of the two cup members 2, thus providing an annular space between said cups and body, which space is filled with an annular filler strip or ring 9 which is preferably of a comparatively soft metal with its end edges expanded by pressing them inwardly from each end edge between said cups and body into close contact therewith, expanding said edges laterally and filling in between the adjacent rounded corners of the cup members and opposed rounded inner corners of the body members 6 and 7 to hold said cups and body against relative longitudinal movement by such expansion of said end edges of said ring and secure said cups and body firmly together. This filler ring thus serves to not only hold the body members 6 and 7 in place upon the cup members 2, but also serves to hold by such expansion of said ring the cup members in place with their adjacent edges in contact with each other and the body members 6 and 7 with the inner edges of their inner flanges 8 in abutting relation. The forcible expansion or spreading inwardly and outwardly of this ring into very firm contact with cup members and body members, binds the parts firmly together and prevents rotation, one relative to another.

The rim or tread of the wheel is formed by the outer flange 10 of the body member 6 fitting closely within and overlapping the outer flange 11 of the member 7, said flange 11 thus forming the tread of the wheel, it extending across the flange 10 for substantially the full width of said inner flange and seated firmly thereon, the two flanges thus forming the wheel rim with the inner flange supporting and strengthening the outer.

The wheel body comprising the cup members 2 and the annular members 6 and 7, together with the filler 9, is thus mounted upon the tubular hub member 1 for free rotation thereon and is held against movement longitudinally of said tube 1, by means of the balls 4, and the halves of the cup as well as the two members 6 and 7 are held together with said members firmly secured in place upon said cup, by the single filler member, which, in the assembly of the wheel, is simply expanded at its end edges between cup and body members. Assembly of the wheel is thus greatly facilitated and attaching of the wheel to the sleeve against movement longitudinally thereof, is accomplished at the same time. An all metal skate wheel of very simple construction and embodying a minimum number of parts is thus secured.

Having thus fully described my invention what I claim is:

1. A device of the character described including an axial tubular member formed with annular raceways extending therearound in the exterior thereof, a series of balls seated in each raceway, an annular body, separate cups for said balls arranged in confronting relation and interposed between said body and tubular member with a space between said body and cups, and a ring member between said body and cups and expanded within said space to cause said body and cups to turn together and to hold the same against relative endwise movement, said balls forming the sole support and an anti-friction bearing for said cups and body and for preventing movement of said body longitudinally of said tubular member.

2. A wheel for the purpose described including an annular body formed of two annular channel members secured together with the open sides of said channels in confronting relation and the outer side walls of said channels overlapped to form the tread of the wheel, and an anti-friction bearing rigidly secured within said annular body and forming the sole support therefor.

3. A wheel for the purpose described including an annular body comprising two annular channel members with the open sides of said channels in confronting relation, cups in said body enclosing anti-friction means, and an annular member between said body and cups for filling the space therebetween to cause the same to turn together and to hold the said cups together and also the said annular channel members.

4. A roller-skate wheel comprising an axial tubular member formed with annular race ways in its exterior, a series of balls seated in each race way, a cup for each series of balls with the sides thereof open toward said tubular member and with the inner free edges of said cups in abutting relation, an annular body member formed of two annular channel members with the open sides thereof in confronting relation, said body being of greater internal diameter than the external diameter of said cups, and an annular filler member within said space between said body and cups and expanded therein to firmly mount said body upon said cups and to hold said cups with their free edges in abutting relation and to hold the two channel members of the body together.

In testimony whereof I affix my signature.
LORA C. SMITH.